United States Patent
Ariza

(10) Patent No.: US 12,499,641 B1
(45) Date of Patent: Dec. 16, 2025

(54) RENDERING CONTENT CROSSING A PORTAL

(71) Applicant: Apple Inc., Cupertino, CA (US)

(72) Inventor: Yujin R. Ariza, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 212 days.

(21) Appl. No.: 18/242,451

(22) Filed: Sep. 5, 2023

Related U.S. Application Data

(60) Provisional application No. 63/405,126, filed on Sep. 9, 2022.

(51) Int. Cl.
*G06T 19/20* (2011.01)

(52) U.S. Cl.
CPC .......... *G06T 19/20* (2013.01); *G06T 2210/62* (2013.01); *G06T 2219/2012* (2013.01)

(58) Field of Classification Search
CPC ... G06T 19/20; G06T 2210/62; G06T 15/405; G06T 2219/2012
See application file for complete search history.

(56) References Cited

U.S. PATENT DOCUMENTS

| | | | |
|---|---|---|---|
| 2013/0127855 A1* | 5/2013 | Miller | G06T 15/405 345/422 |
| 2017/0330369 A1* | 11/2017 | Niemelä | G06T 15/503 |

OTHER PUBLICATIONS

Thomas Rinsma, "Rendering recursive portals with OpenGL", May 19, 2013 (Year: 2013).*

* cited by examiner

*Primary Examiner* — Kee M Tung
*Assistant Examiner* — Xiaoming Wei
(74) *Attorney, Agent, or Firm* — Fernando & Partners, LLP

(57) ABSTRACT

In one implementation, a method of rendering a scene including a portal is performed by a device including one or more processors and non-transitory memory. The method includes obtaining a rendering of first content having a plurality of first pixels at respective pixel locations having respective first pixel color values. The method includes obtaining a portal count map having a plurality of portal count pixels at the respective pixel locations having respective pixel portal count values indicating whether the corresponding pixel location corresponds to a portal. The method includes obtaining a rendering of second content having a plurality of second pixels at the respective pixel locations having respective second pixel color values. The method includes obtaining a portal cross map having a plurality of portal cross pixels at the respective pixel locations having respective pixel portal cross values indicating whether the corresponding pixel location corresponds to second content outside the portal. The method includes identifying an overwrite set of the respective pixel locations including pixel locations indicated by the portal count map as corresponding to the portal and including pixel locations indicated by the portal cross map as corresponding to the second content outside the portal. The method includes replacing the first pixel color values of pixels in the rendering of the first content at the overwrite set of the respective pixel locations with the corresponding second pixel color values.

20 Claims, 12 Drawing Sheets

600

At a device including a first image sensor, a first display, one or more processors, and non-transitory memory:

Obtain a rendering of first content having a plurality of first pixels at respective pixel locations having respective first pixel color values ⎯610

Obtaining a portal count map having a plurality of portal count pixels at the respective locations having respective pixel portal count values indicating whether the corresponding pixel location corresponds to a portal ⎯620

Obtaining a rendering of second content having a plurality of second pixels at the respective pixel locations having respective second pixel color values ⎯630

Obtaining a portal cross map having a plurality of portal cross pixels at the respective pixel locations having respective pixel portal cross values indicating whether the corresponding pixel location corresponds to second content outside the portal ⎯640

Identifying an overwrite set of the respective pixel locations including pixel locations indicated by the portal count map as corresponding to the portal and including pixel locations indicated by the portal cross map as corresponding to second content outside the portal ⎯650

Replacing the first pixel color values of pixels in the rendering of first content at the overwrite set of the respective pixel locations with the corresponding second pixel color values ⎯660

Figure 6

RENDERING CONTENT CROSSING A PORTAL

CROSS-REFERENCE TO RELATED APPLICATIONS

This application claims priority to U.S. Provisional Patent App. No. 63/405,126, filed on Sep. 9, 2022, which is hereby incorporated by reference in its entirety.

TECHNICAL FIELD

The present disclosure generally relates to systems, methods, and devices for rendering content crossing a portal.

BACKGROUND

In various implementations, a scene is rendered including a first environment with a portal through which a second environment can be seen.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 6 is a flowchart representation of a method of rendering a scene including a portal in accordance with some implementations.

Figure 1:
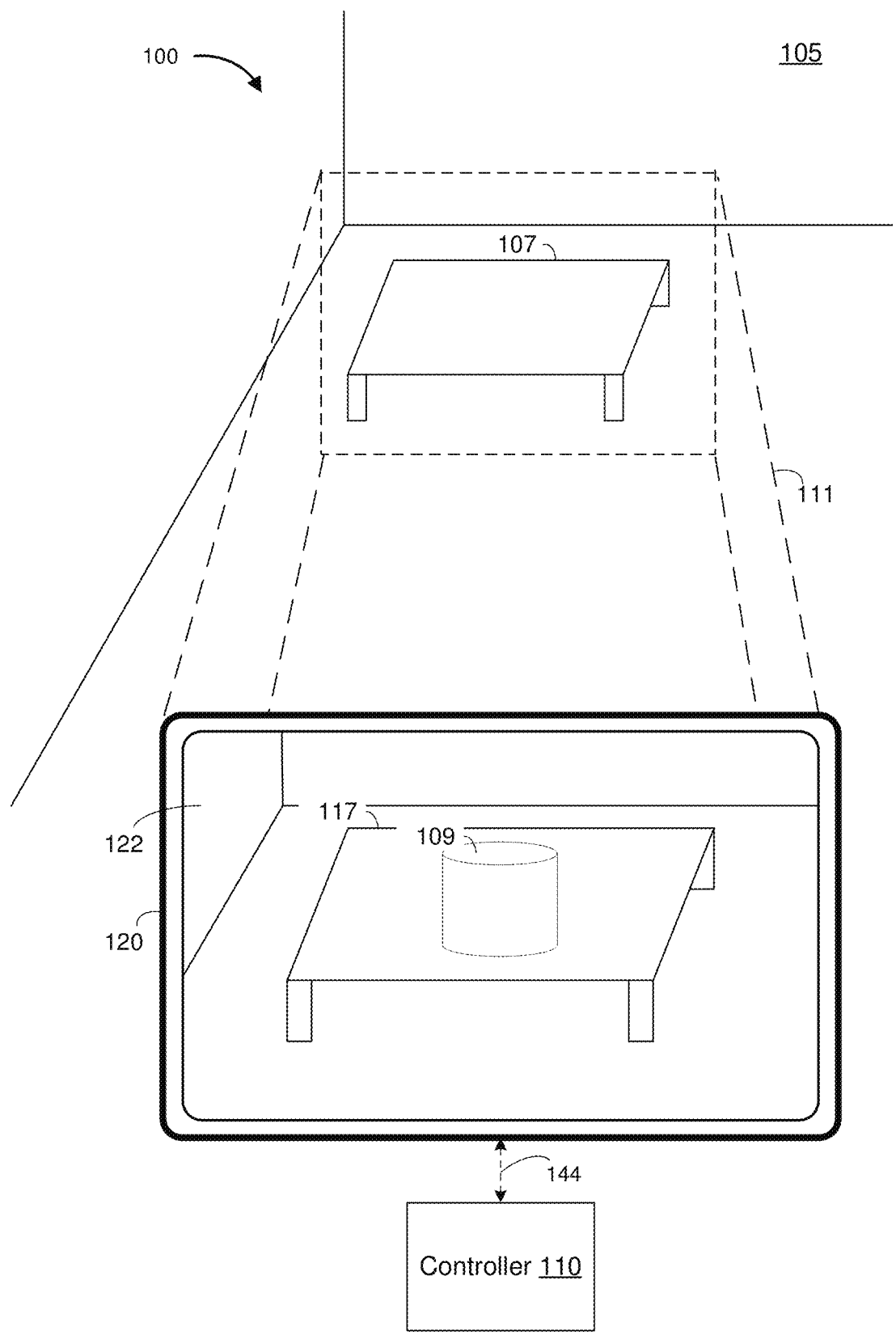
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and method for rendering a scene including a portal. In various implementations, the method is performed by a device including one or more processors and non-transitory memory. The method includes obtaining a rendering of first content having a plurality of first pixels at respective pixel locations having respective first pixel color values. The method includes obtaining a portal count map having a plurality of portal count pixels at the respective pixel locations having respective pixel portal count values indicating whether the corresponding pixel location corresponds to a portal. The method includes obtaining a rendering of second content having a plurality of second pixels at the respective pixel locations having respective second pixel color values. The method includes obtaining a portal cross map having a plurality of portal cross pixels at the respective pixel locations having respective pixel portal cross values indicating whether the corresponding pixel location corresponds to second content outside the portal. The method includes identifying an overwrite set of the respective pixel locations including pixel locations indicated by the portal count map as corresponding to the portal and including pixel locations indicated by the portal cross map as corresponding to the second content outside the portal. The method includes replacing the first pixel color values of pixels in the rendering of the first content at the overwrite set of the respective pixel locations with the corresponding second pixel color values.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

In various implementations, a scene includes a first three-dimensional environment and a portal through which a second three-dimensional environment can be seen. Thus, the portal corresponds to a surface, which may or may not be displayed, in the first three-dimensional environment that corresponds to a second three-dimensional environment. Rendering content crossing the portal and, therefore, partially present in both the first three-dimensional environment and second three-dimensional environment, can be time-consuming and may require multiple rendering passes.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 7. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 8.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
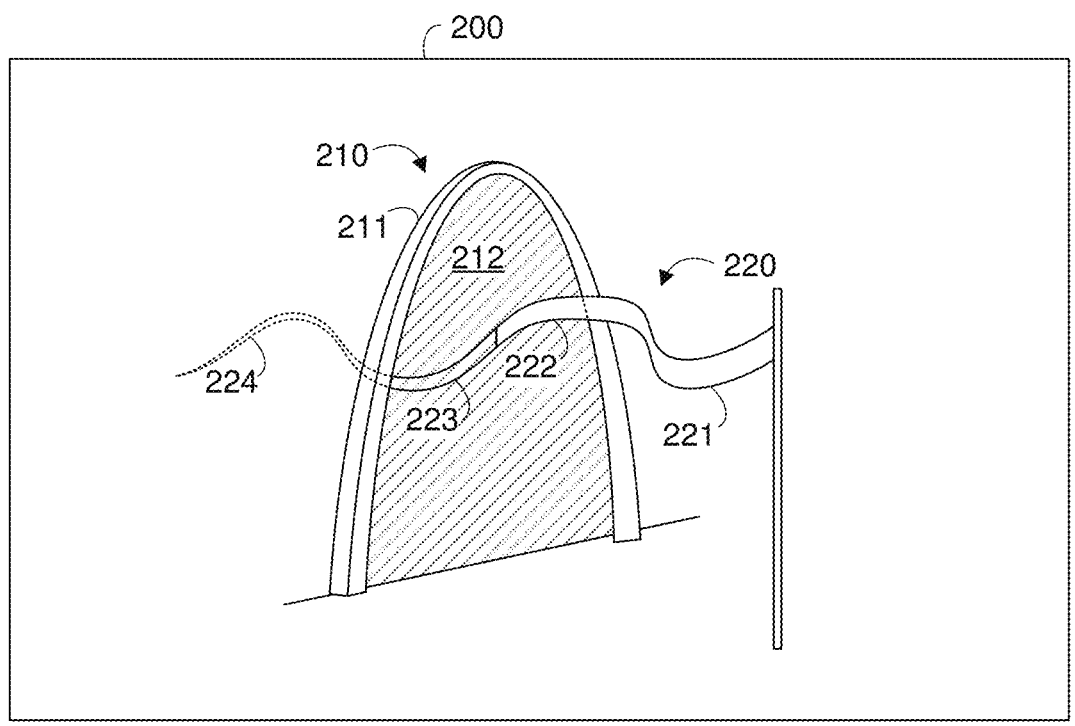
FIG. 2 illustrates an image a first scene including a portal.

FIG. 2 illustrates an image 200 of a first scene including a banner 220 crossing a portal 210. The portal 210 includes an opaque arch 211 and a partially transparent portal plane 212. In various implementations, the portal plane 212 is fully transparent, or invisible. The banner 220 includes a first portion 221 outside the portal 210 and a second portion 222 outside the portal 210. The first portion 221 does not overlap with the portal plane 212 and the second portion 222 overlaps with the portal plane 212. The banner 220 includes a third portion 223 inside the portal 210 and a fourth portion 224 inside the portal 210. The third portion 223 overlaps with the portal plane 212 and the fourth portion 224 does not overlap with the portal plane 212. Thus, the first portion 221 and the second portion 222 are fully displayed. The third portion 223 is displayed partially obscured by the partially transparent portal plane 212. The fourth portion 224, represented by a dotted outline, is not displayed.

To render the image 200, in various implementations, a device first renders the opaque portions of the portal 210, e.g., the arch 211. Next, in one pass, the device renders the banner 220 at pixel locations corresponding to the portal plane 212, e.g., the second portion 222 and the third portion 223. Next, in another pass, the device renders the banner 220 at pixel locations corresponding to portions outside of the portal 210, e.g., the first portion 221 and the second portion 222. Finally, the device renders the transparent portions of the portal 210, e.g., the portal plane 212, subject to a depth test (e.g., only rendering portions that are closer to the image perspective than other objects). Thus, the banner 220 is rendered in two passes and portions of the banner 220 outside the portal 210 and overlapping the portal plane 212 are rendered twice. In various implementations, such rendering is inefficient. Such inefficiency is exacerbated when there are multiple portals in the scene. Described below is a more efficient rendering procedure in which the banner 220 is rendered in a single pass.

Figure 3A:
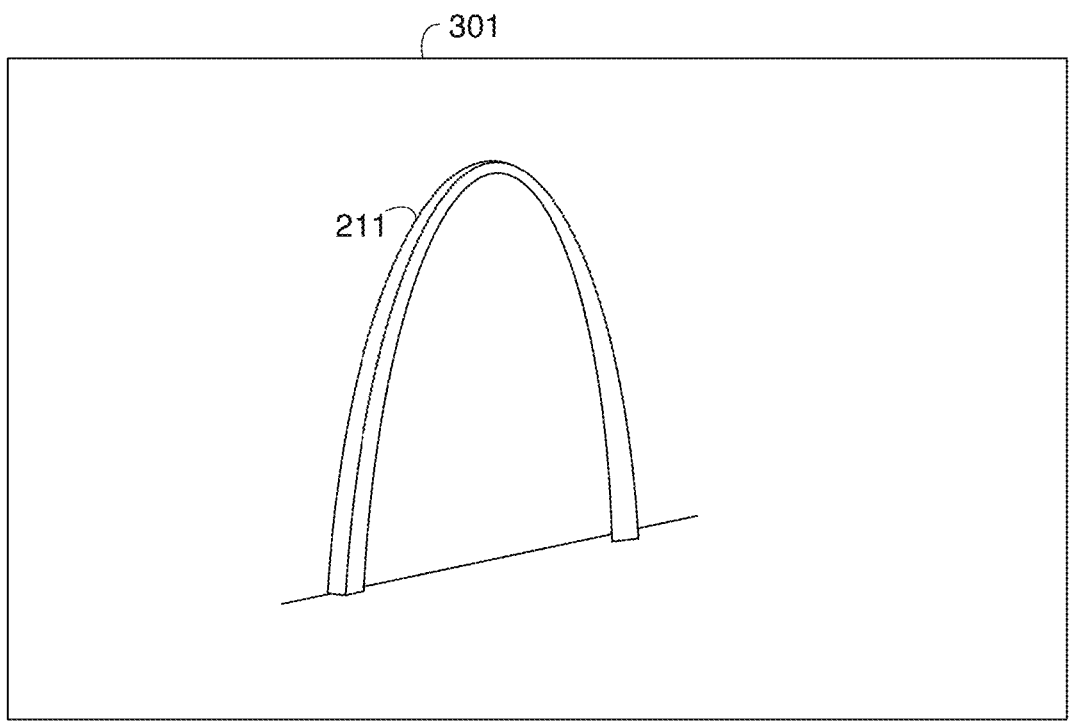
FIG. 3A-3F illustrate renderings and maps used in generating the image of FIG. 2.

FIG. 3A illustrates a first rendering 301 of the opaque portions of the portal 210, e.g., the arch 211. The first rendering 301 includes a matrix of pixels, each pixel having a respective pixel location and pixel color value.

Figure 3B:
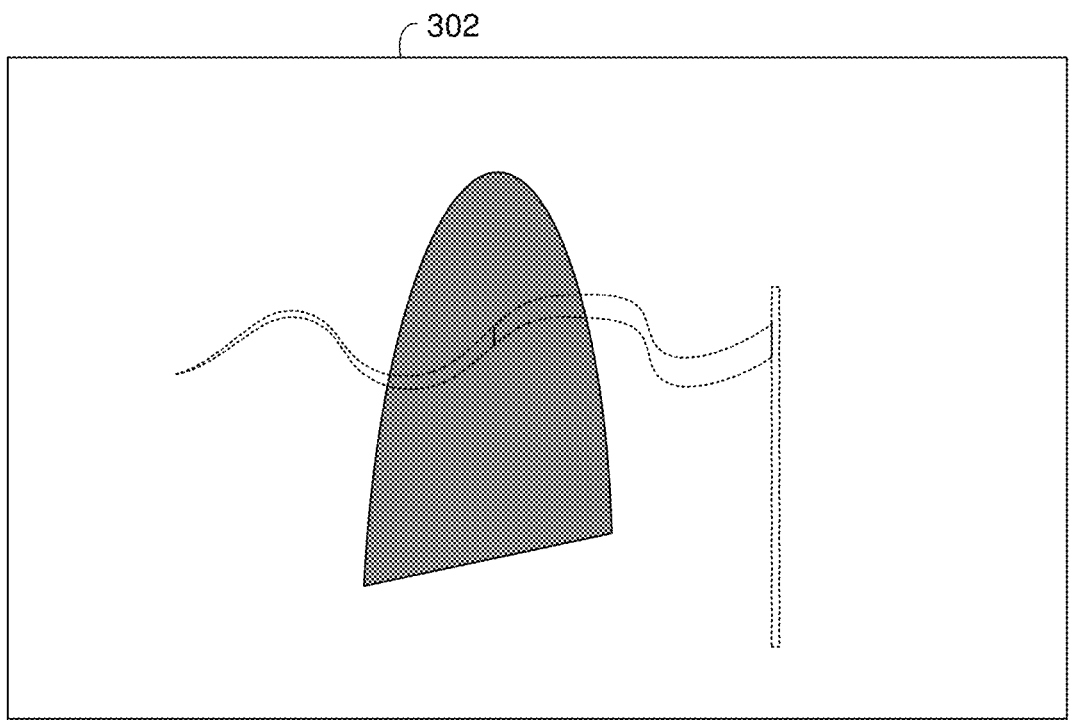

FIG. 3B illustrates a portal count map 302. The portal count map 302 includes a matrix of pixels, each pixel having a respective pixel location and pixel portal count value. Each pixel portal count value indicates the number of portals at the respective pixel location. Thus, each pixel having a pixel location that corresponds to a portion of the portal plane 212 has a pixel portal count value of 1 and each pixel having a pixel location that does not correspond to a portion of the portal plane 212 has a pixel portal count value of 0. In various implementations, the portal count map 302 is generated by incrementing the pixel portal count value (initially set to 0 for each pixel) by 1 for each pixel at a pixel location corresponding to the portal plane 212.

Thus, in various implementations, in the portal count map 302, the pixels corresponding to the first portion 221 have a portal count value of 0, the pixels corresponding to the second portion 222 and the third portion 223 have a portal count value of 1, and the pixels corresponding to the fourth portion 224 have a portal count value of 0.

Figure 3C:
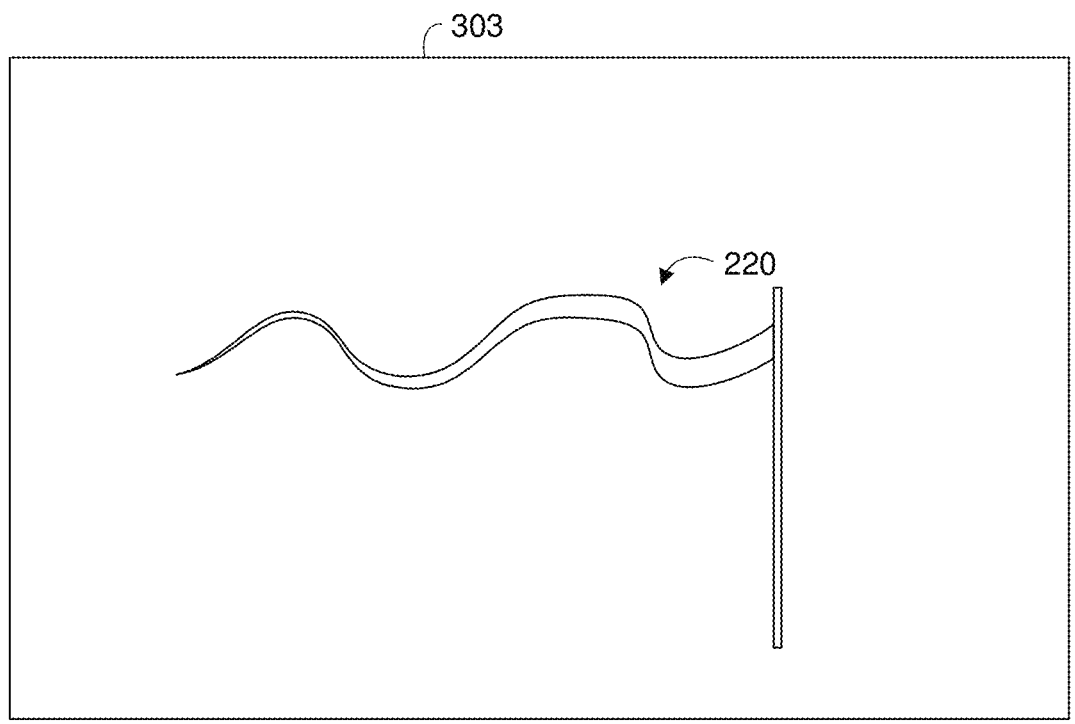

FIG. 3C illustrates a second rendering 303 of the banner 220. The second rendering 303 includes a matrix of pixels, each pixel having a respective pixel location and pixel color value.

Figure 3D:
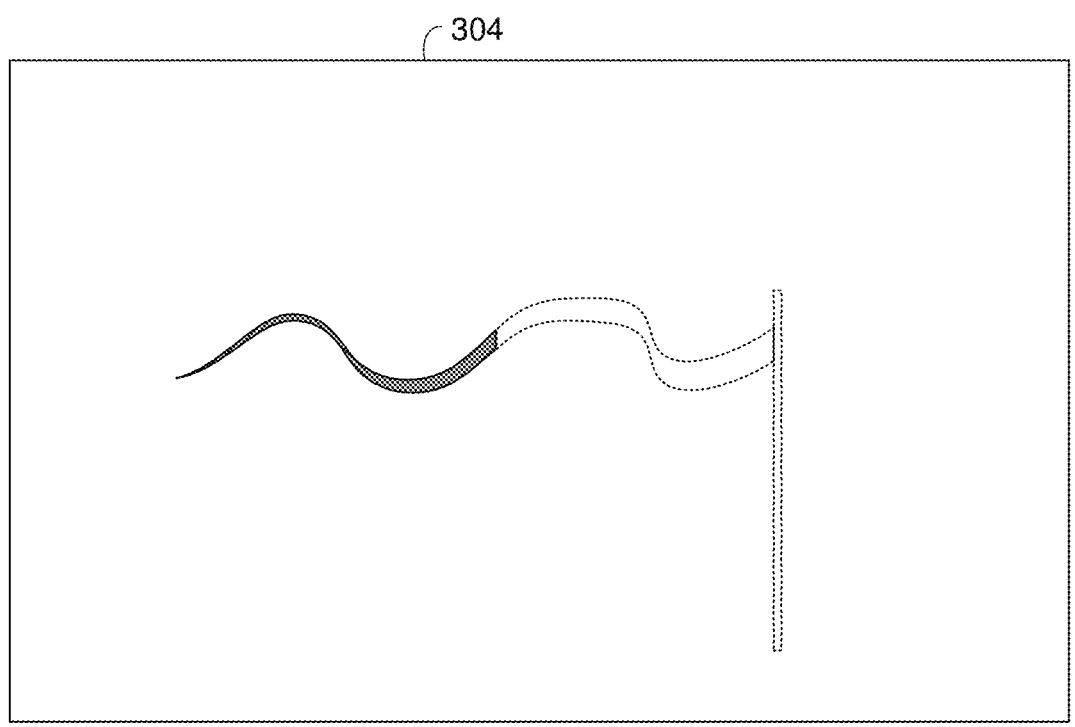

FIG. 3D illustrates a portal cross map 304. The portal cross map 304 includes a matrix of pixels, each pixel having a respective pixel location and pixel portal cross value. Each pixel portal cross value indicates the number of portals crossed by the banner 220 (e.g., from the image perspective) at the respective pixel location. Thus, each pixel having a pixel location that corresponds to a portion of the banner 220 inside the portal 210 has a pixel portal cross value of 1 and each pixel having a pixel location that does not correspond to a portion of the banner 220 inside the portal 210 has a pixel portal cross value of 0.

Thus, in various implementations, in the portal cross map 304, the pixels corresponding to the first portion 221 and the second portion 222 have a portal cross value of 0 and the pixels corresponding to the third portion 223 and the fourth portion 224 have a portal cross value of 1.

Figure 3E:
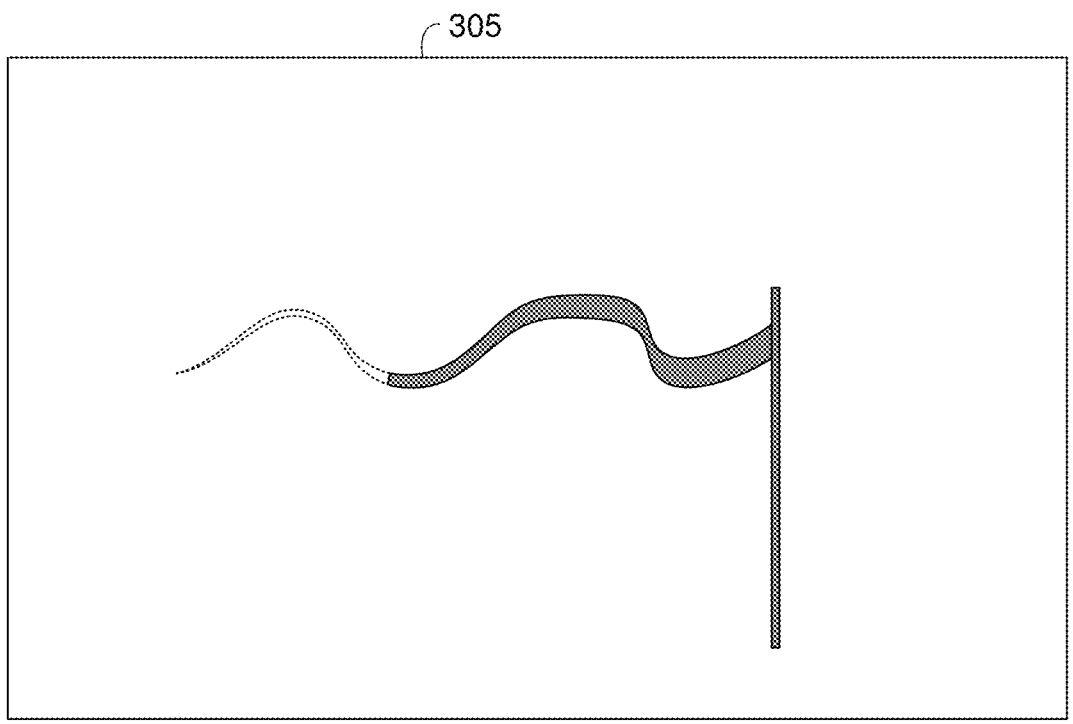

FIG. 3E illustrates a comparison result map 305. The comparison result map 305 includes a matrix of pixels, each pixel having a respective pixel location and pixel comparison result value. Each pixel of the comparison result map 305 that corresponds to an overwrite operation has a value of 1 and each pixel having a pixel location that does not correspond to an overwrite operation has a value of 0. In various implementations, the comparison result map 305 is generated by applying a comparison operation to the portal count map 302 and the portal cross map 304. In various implementations, the comparison operation is a less-than-or-equal-to operation. For example, in various implementations, for a pixel in the comparison result map 305, the pixel comparison result value is 1 if the pixel portal cross value (of the corresponding pixel in the portal cross map 304) is less than or equal to the pixel portal count value (of the corresponding pixel in the portal count map 302) and is 0 otherwise.

Thus, in various implementations, the first portion 221 is associated with a pixel portal cross value of 0 which is less than or equal to the associated portal count value of 0; therefore, the first portion 221 is associated with a comparison result value of 1. The second portion 222 is associated with a portal cross value of 0 which is less than or equal to the associated portal count value of 1; therefore, the second portion 222 is associated with a comparison result value of 1. The third portion 223 is associated with a portal cross value of 1 which is less than or equal to the associated portal count value of 1; therefore, the third portion 223 is associated with a comparison result value of 1. The fourth portion 224 is associated with a portal cross value of 1 which is not less than or equal to the associated portal count value of 0; therefore, the fourth portion 224 is associated with a comparison result value of 0.

Figure 3F:
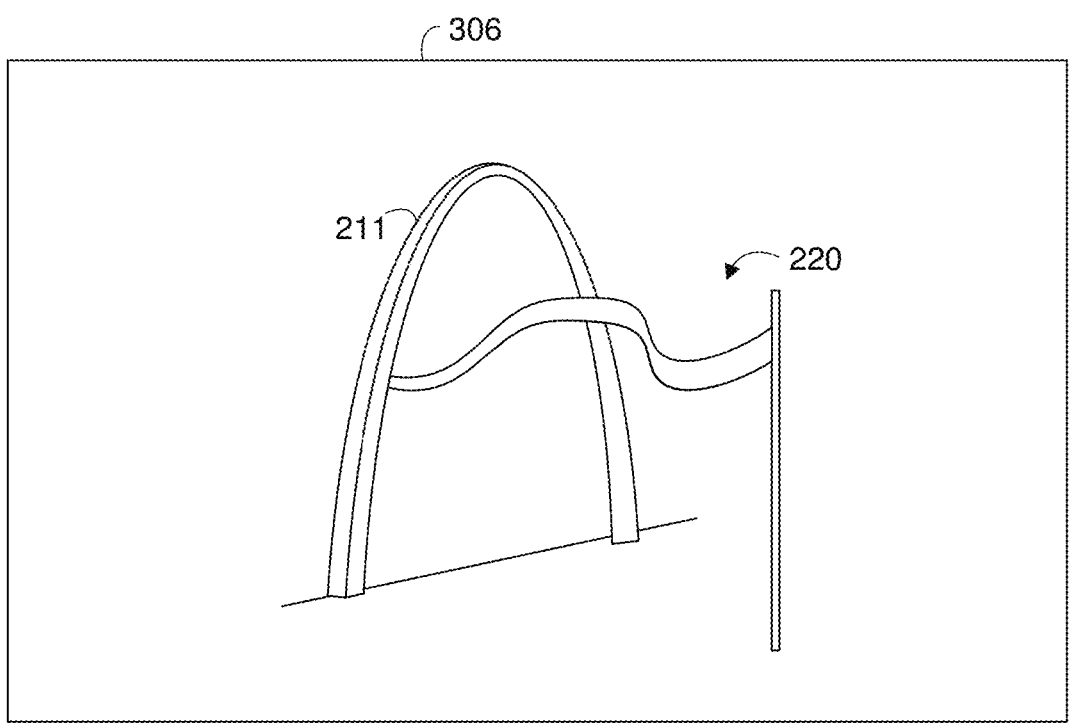

FIG. 3F illustrates a third rendering 306. The third rendering 306 includes a matrix of pixels, each pixel having a respective pixel location and pixel color value. The third rendering 306 is generated by replacing the pixel color value of the first rendering 301 with the pixel color value of the second rendering 303 for each pixel having a pixel location at which the corresponding pixel of the comparison result map 305 is 1. Thus, the third rendering 306 includes the arch 211 and a portion of the banner 220, e.g., the first portion 221, the second portion 222, and the third portion 223.

In various implementations, the image 200 of FIG. 2 is generated by rendering, subject to a depth test, the partially transparent portions of the portal 210, e.g., the portal plane 212, over the third rendering 306. In various implementations, transparent objects inside the portal, such as a glass sphere, are also rendered over the third rendering 306.

Figure 4:
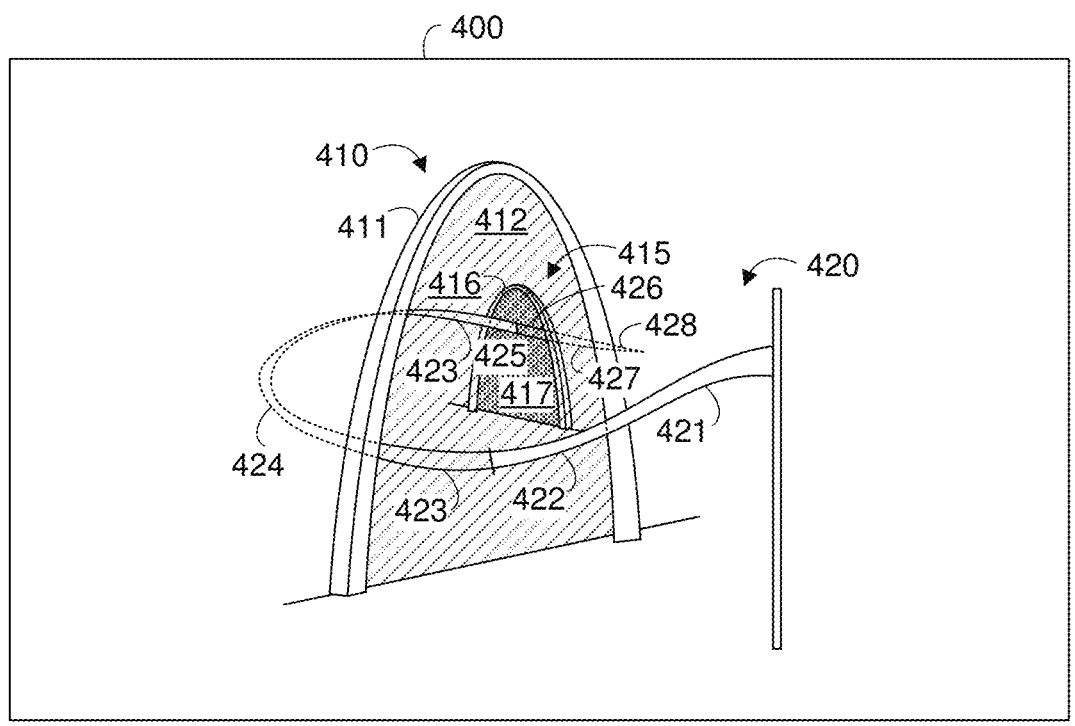
FIG. 4 illustrates an image of a second scene including multiple portals.

FIG. 4 illustrates an image 400 of a second scene including a banner 420 crossing a first portal 410 and a second portal 415 within the first portal 410. The first portal 410 includes an opaque first arch 411 and a partially transparent first portal plane 412. The second portal 415 includes an opaque second arch 416 and a partially transparent second portal plane 417. In various implementations, the first portal plane 412 and/or the second portal plane 417 are fully transparent, or invisible.

The banner 420 includes a first portion 421 outside the first portal 410 and a second portion 422 outside the first portal 410. The first portion 421 does not overlap with the first portal plane 412 and the second portion 422 overlaps with the first portal plane 412. The banner 420 includes a third portion 423 inside the first portal 410 but not the second portal 415, a fourth portion 424 inside the first portal 410 but not the second portal 415, and a fifth portion 425 inside the first portal 410 but not the second portal 415. The third portion 423 is discontinuous, including two parts separated by the fourth portion 424. The third portion 423 overlaps with the first portal plane 412 but not the second portal plane 417, the fourth portion 424 does not overlap with the first portal plane 412 or the second portal plane 417, and the fifth portion 425 overlaps with the first portal plane 412 and the second portal plane 417.

The banner 420 includes a sixth portion 426 inside the second portal 415, a seventh portion 427 inside the second portal 415, and an eighth portion 418 inside the second portal 415. The sixth portion 426 overlaps with the first portal plane 412 and the second portal plane 417, the seventh portion 427 overlaps with the first portal plane 412 but not the second portal plane 417, and the eighth portion 428 does not overlap with the first portal plane 412 or the second portal plane 417.

Thus, the first portion 421 and the second portion 422 are fully displayed. The third portion 423 is displayed partially obscured by the partially transparent first portal plane 412. The fourth portion 424 is not displayed. The fifth portion 425 (like the third portion 423) is displayed partially obscured by the partially transparent first portal plane 412. The sixth portion 426 is displayed partially obscured by the partially transparent first portal plane 412 and further partially obscured by the partially transparent second portal plane 417. The seventh portion 427 and the eighth portion 428 are not displayed.

In various implementations, to render the banner 420 in the image 400 requires multiple passes. Described below is a more efficient rendering procedure in which the banner 420 is rendered in a single pass.

Figure 5A:
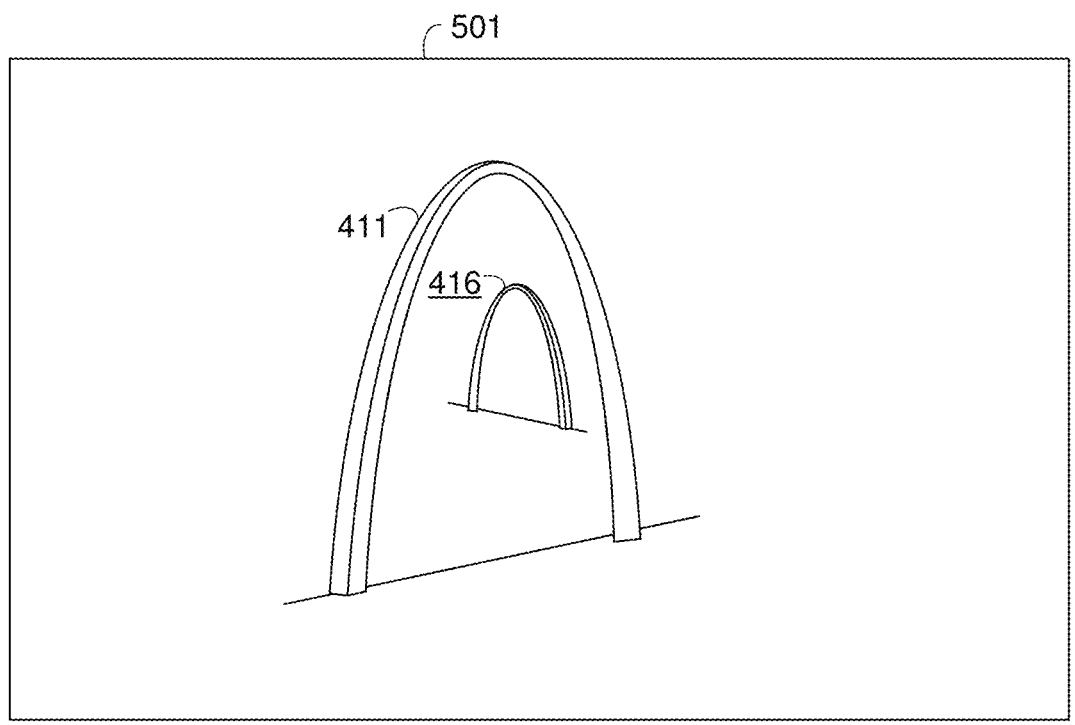
FIGS. 5A-5F illustrate renderings and maps used in generating the image of FIG. 4.

FIG. 5A illustrates a first rendering 501 of the opaque portions of the first portal 410 and the second portal 415, e.g., the first arch 411 and the second arch 416. The first rendering 501 includes a matrix of pixels, each pixel having a respective pixel location and pixel color value.

Figure 5B:
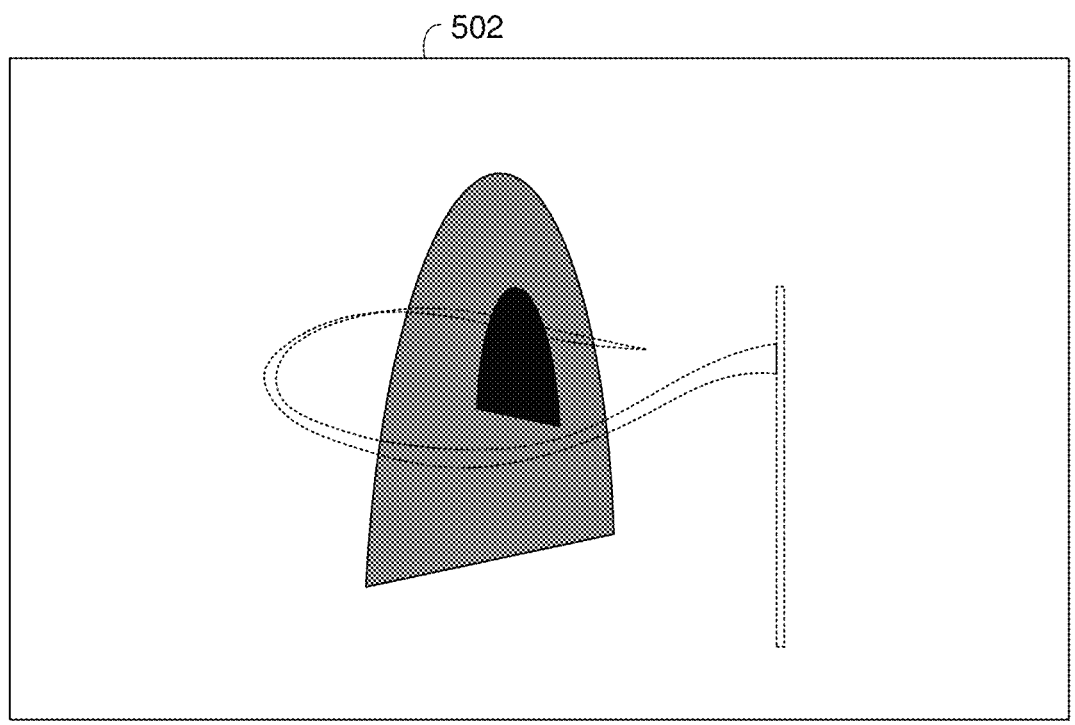

FIG. 5B illustrates a portal count map 502. The portal count map 502 includes a matrix of pixels, each pixel having a respective pixel location and pixel portal count value. Each pixel portal count value indicates the number of portals at the respective pixel location. Thus, each pixel having a pixel location that corresponds to a portion of the first portal plane 412 (but not the second portal plane 417) has a pixel portal count value of 1, each pixel having a pixel location that corresponds to a portion of the first portal plane 412 and the second portal plane 417 has a pixel portal count value of 2, and each pixel having a pixel location that does not correspond to a portion of the first portal plane 412 has a pixel portal count value of 0. In various implementations, the portal count map 502 is generated by incrementing the pixel portal count value (initially set to 0 for each pixel) by 1 for each pixel at a pixel location corresponding to the first portal plane 412 then incrementing the pixel portal count value by 1 for each pixel at a pixel location corresponding to the second portal plane 417.

Thus, in various implementations, in the portal count map 504, the pixels corresponding to the first portion 421 have a portal count value of 0, the pixels corresponding to the second portion 422 and the third portion 423 have a portal count value of 1, the pixels corresponding to the fourth portion 424 have a portal count value of 0, the pixels corresponding to the fifth portion 425 and the sixth portion 426 have a portal count value of 2, the pixels of the seventh portion 427 have a portal count value of 1, and the pixels of the eight portion 428 have a portal count value of 0.

Figure 5C:
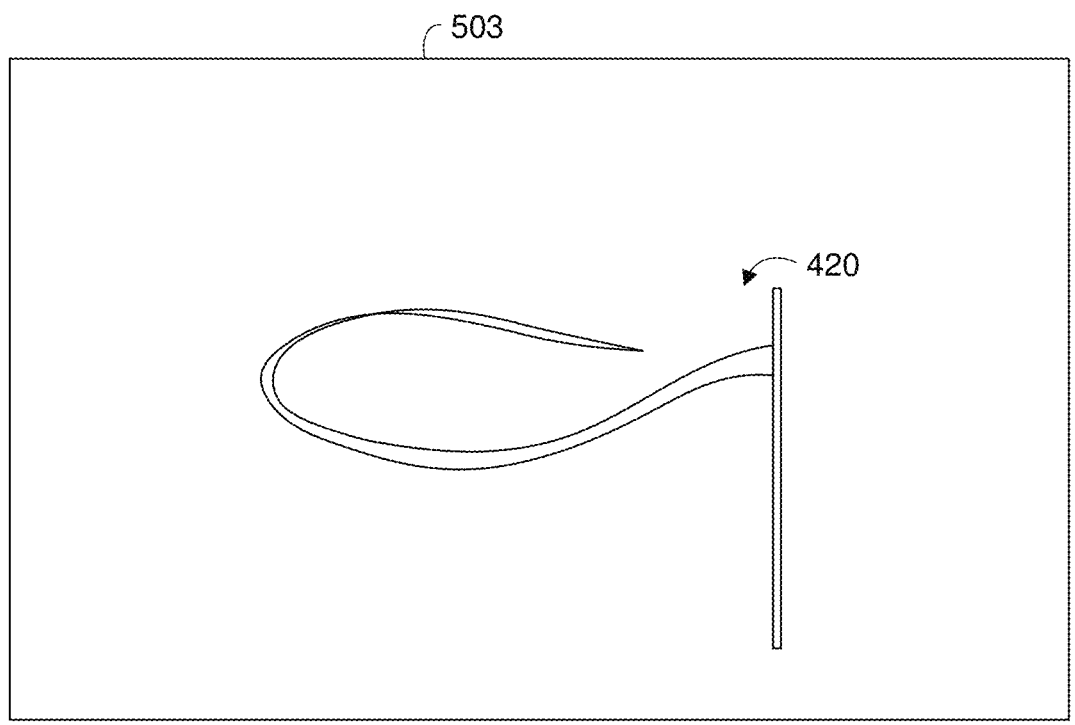

FIG. 5C illustrates a second rendering 503 of the banner 420. The second rendering 503 includes a matrix of pixels, each pixel having a respective pixel location and pixel color value.

Figure 5D:
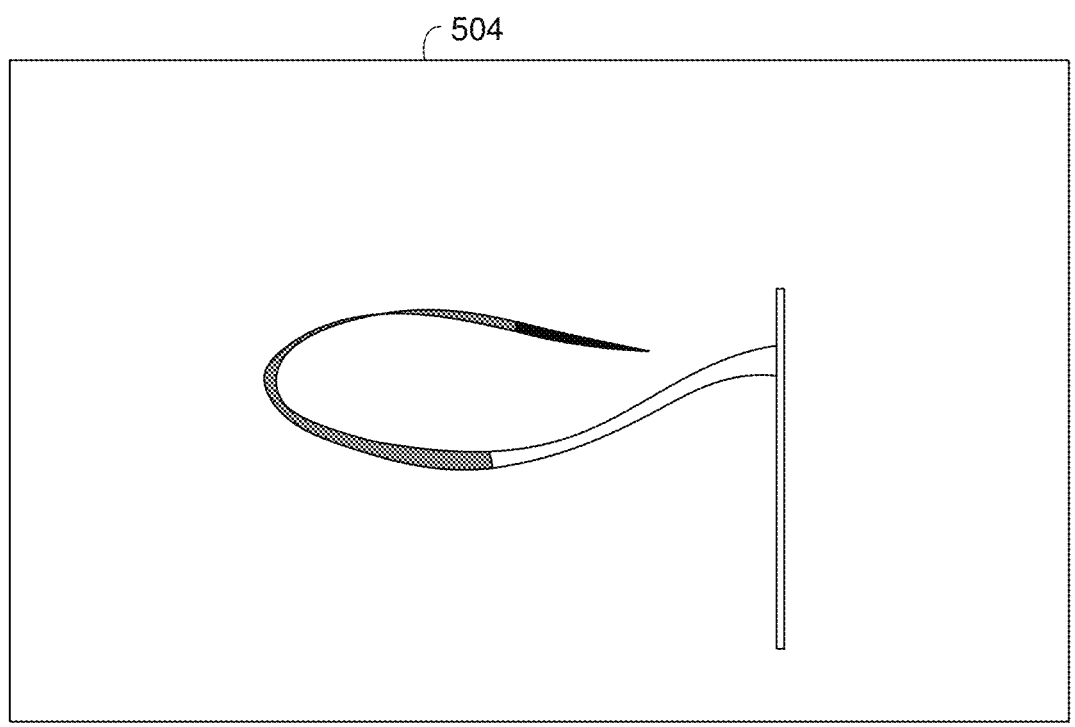

FIG. 5D illustrates a portal cross map 504. The portal cross map 504 includes a matrix of pixels, each pixel having a respective pixel location and pixel portal cross value. Each pixel portal cross value indicates the number of portals crossed by the banner 420 (e.g., from the image perspective) at the respective pixel location. Thus, each pixel having a pixel location that corresponds to a portion of the banner 420 inside the first portal 410 but not the second portal 415 has a pixel portal cross value of 1, each pixel having a pixel location that corresponds to a portion of the banner 420 inside the first portal 410 and the second portal 415 has a pixel portal count value of 2, and each pixel having a pixel location that does not correspond to a portion of the banner 420 inside the first portal 410 has a pixel portal cross value of 0.

Thus, in various implementations, in the portal cross value map 504, the pixels corresponding to the first portion 421 and the second portion 422 have a portal cross value of 0, the pixels corresponding to the third portion 423, the fourth portion 424, and the fifth portion 425 have a portal cross value of 1, and the pixels corresponding to the sixth portion 426, seventh portion 427, and eighth portion 428 have a portal cross value of 2.

Figure 5E:
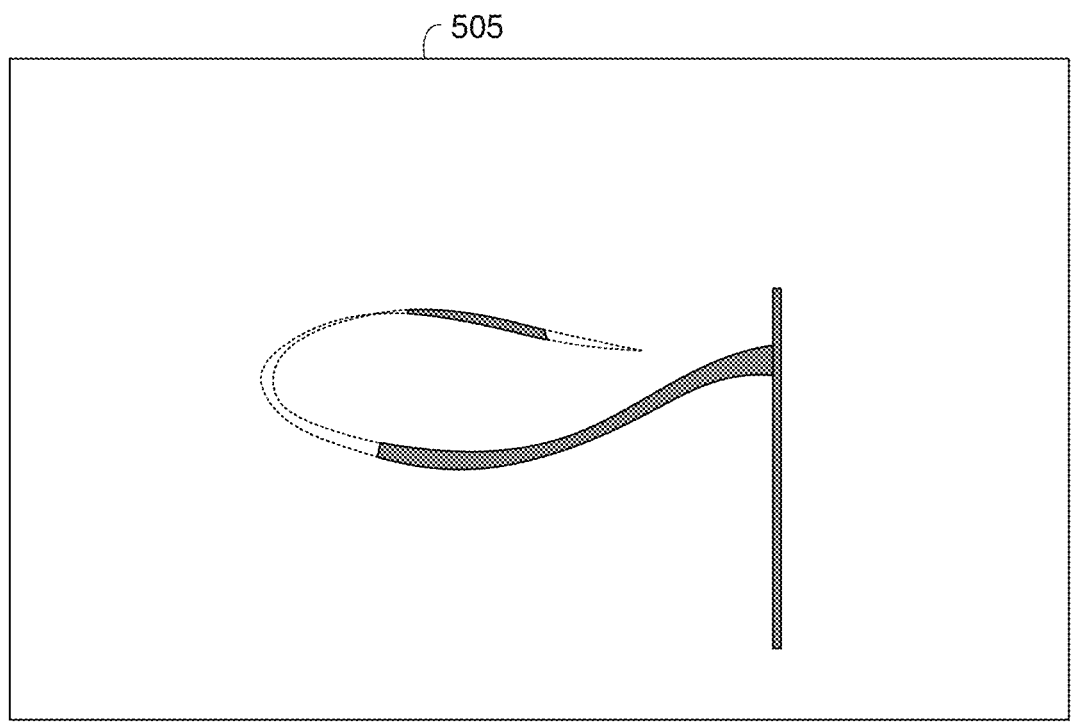

FIG. 5E illustrates a comparison result map 505. The comparison result map 505 includes a matrix of pixels, each pixel having a respective pixel location and pixel comparison result value. Each pixel of the comparison result map 505 that corresponds to an overwrite operation has a value of 1 and each pixel having a pixel location that does not correspond to an overwrite operation has a value of 0. In various implementations, the comparison result map 505 is generated by applying a comparison operation to the portal count map 502 and the portal cross map 504. In various implementations, the comparison operation is a less-than-or-equal-to operation. For example, in various implementations, for a pixel in the comparison result map 505, the pixel comparison result value is 1 if the pixel portal cross value (of the corresponding pixel in the portal cross map 504) is less than or equal to the pixel portal count value (of the corresponding pixel in the portal count map 502) and is 0 otherwise.

Thus, in various implementations, the first portion 421 is associated with a pixel portal cross value of 0 which is less than or equal to the associated portal count value of 0; therefore, the first portion 421 is associated with a comparison result value of 1. The second portion 422 is associated with a portal cross value of 0 which is less than or equal to the associated portal count value of 1; therefore, the second portion 422 is associated with a comparison result value of 1. The third portion 423 is associated with a portal cross value of 1 which is less than or equal to the associated portal count value of 1; therefore, the third portion 423 is associated with a comparison result value of 1. The fourth portion 424 is associated with a portal cross value of 1 which is not less than or equal to the associated portal count value of 0; therefore, the fourth portion 424 is associated with a comparison result value of 0.

The fifth portion 425 is associated with a portal cross value of 1 which is less than or equal to the associated portal count value of 2; therefore, the fifth portion 425 is associated with a comparison result value of 1. The sixth portion 426 is associated with a portal cross value of 2 which is less than or equal to the associated portal count value of 2; therefore, the sixth portion 426 is associated with a comparison result value of 1. The seventh portion 427 is associated with a portal cross value of 2 which is not less than or equal to the associated portal count value of 1; therefore, the seventh portion 427 is associated with a comparison result value of 0. The eighth portion 428 is associated with a portal cross value of 2 which is not less than or equal to the associated portal count value of 0; therefore, the eighth portion 428 is associated with a comparison result value of 0.

Figure 5F:
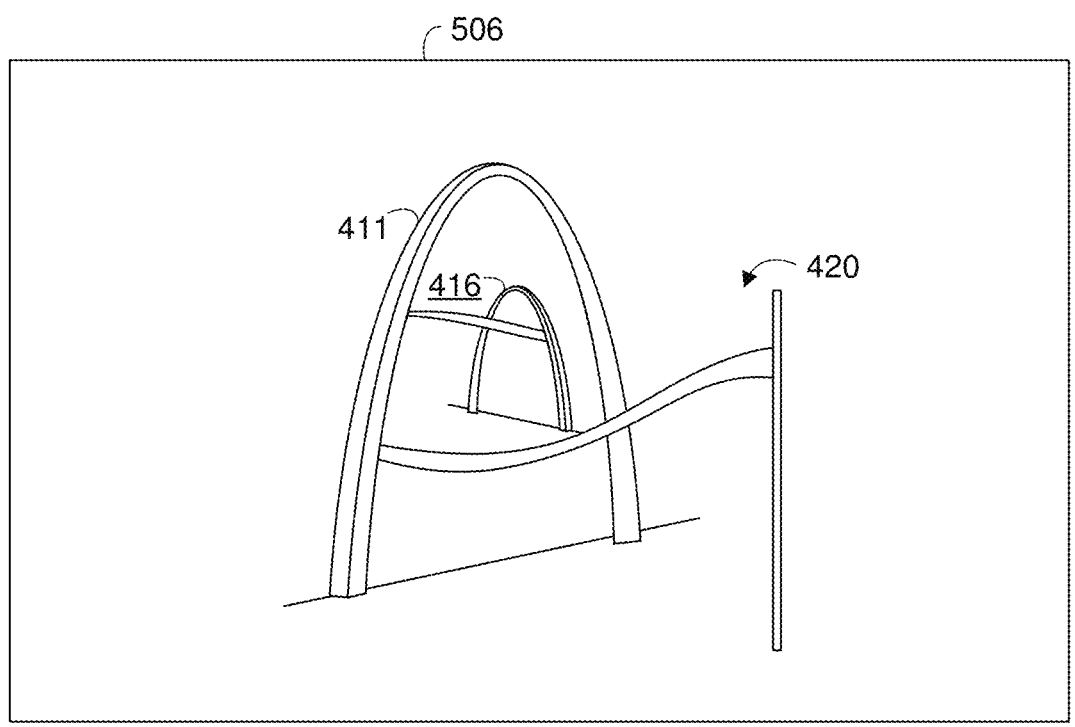

FIG. 5F illustrates a third rendering 506. The third rendering 506 includes a matrix of pixels, each pixel having a respective pixel location and pixel color value. The third rendering 506 is generated by replacing the pixel color value of the first rendering 501 with the pixel color value of the second rendering 503 for each pixel having a pixel location at which the corresponding pixel of the comparison result map 505 is 1. Thus, the third rendering 506 includes the first arch 411, the second arch 416, and a portion of the banner 420, e.g., the first portion 421, the second portion 422, the third portion 423, the fifth portion 425, and the sixth portion 426.

In various implementations, the image 400 of FIG. 4 is generated by rendering, subject to a depth test, the transparent portions of the first portal 410 and the second portal 415, e.g., the first portal plane 412 and the second portal plane 417, over the third rendering 506. In various implementations, transparent objects inside the first portal and/or the second portal, such as a glass sphere, are also rendered over the third rendering 506.

FIG. 6 is a flowchart representation of a method of rendering a scene including a portal in accordance with some implementations. In various implementations, the method 600 is performed by a device including one or more processors and non-transitory memory (e.g., the electronic device 120 of FIG. 1). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device obtaining a rendering of first content having a plurality of first pixels at respective pixel locations having respective first color values. For example, FIG. 3A illustrates the first rendering 301 of the arch 211. As another example, FIG. 5A illustrates the first rendering 501 of the first arch 411 and the second arch 416.

The method 600 continues, in block 620, with the device obtaining a portal count map having a plurality of portal count pixels at the respective pixel locations having respective pixel portal count values indicating whether the corresponding pixel location corresponds to a portal. For example, FIG. 3B illustrates a portal count map 302 having a value of 1 at locations corresponding to the portal plane 212 and a value of 0 elsewhere.

In various implementations, the respective pixel portal count values further indicate a number of portals at the respective pixel locations. In various implementations, at least one respective pixel portal count value is greater than one. For example, FIG. 5B illustrates a portal count map 502 having a value of 1 at locations corresponding to the first portal plane 412 but not the second portal plane 417, a value of 2 at locations corresponding to the first portal plane 412 and the second portal plane 417, and a value of 0 elsewhere.

Thus, in various implementations, the portal count value indicates that the corresponding pixel location corresponds to a portal when the value is 1 or greater.

Although various example values (e.g., 0, 1, or 2), value ranges (e.g., 1 or greater), and comparison operations (e.g., less-than-or-equal-to) are disclosed through the specification, in various implementations, other values, value ranges, and comparison operations may be used. For example, in various implementations, the portal count value is a Boolean (e.g., non-numeric) value than indicates that the corresponding pixel location corresponds to a portal.

The method 600 continues, in block 630, with the device obtaining a rendering of second content having a plurality of second pixels at the respective pixel locations having respective second pixel color values. For example, FIG. 3C illustrates the second rendering 303 of the banner 220. As another example, FIG. 5A illustrates the second rendering 503 of the banner 420.

The method 600 continues, in block 640, with the device obtaining a portal cross map having a plurality of portal cross pixels at the respective pixel locations having respective pixel portal cross values indicating whether the corresponding pixel location corresponds to second content outside the portal. For example, FIG. 3D illustrates a portal cross map 304 having a value of 0 at locations corresponding to portions of the banner 220 outside the portal 210 and a value of 1 at locations corresponding to portions of the banner 220 inside the portal 210.

In various implementations, the respective pixel portal cross values further indicate a number of portals crossed by the second content at the respective pixel locations. In various implementations, at least one respective pixel portal cross value is greater than one. For example, FIG. 5D illustrates a portal cross map 504 having a value of 0 at locations corresponding to portions of the banner 420 outside the first portal 410, a value of 1 at locations corresponding to portions of the banner 420 inside the first portal 410 but outside the second portal 415, and a value of 2 at locations corresponding to portions of the banner 420 inside the first portal 410 and the second portal 415.

Thus, in various implementations, the portal cross value indicates that the corresponding pixel location corresponds to second content outside the portal when the value is 0. In various implementations, the portal cross value indicates that the corresponding pixel location corresponds to second content outside the portal (e.g., outside a second portal, but inside a first portal) when the value is 1. Thus, in various implementations, the portal cross value indicates that the corresponding pixel location corresponds to second content outside the portal when the portal cross value is less than the maximum value of the portal cross map.

As noted above, although various example values (e.g., 0, 1, or 2), value ranges (e.g., 1 or greater), and comparison operations (e.g., less-than-or-equal-to) are disclosed through the specification, in various implementations, other values, value ranges, and comparison operations may be used. For example, in various implementations, the portal cross value is a Boolean (e.g., non-numeric) value that indicates that the corresponding pixel location corresponds to second content outside the portal. As another example, in various implementations, the portal cross value indicates that the corresponding pixel location corresponds to second content outside the portal when the portal cross value is greater than a minimum value of the portal cross map.

The method 600 continues, in block 650, with the device identifying an overwrite set of the respective pixel locations including pixel locations indicated by the portal count map as corresponding to the portal and including pixel locations indicated by the portal cross map as corresponding to second content outside the portal. For example, FIG. 3E illustrates the comparison result map 305 indicating a set of overwrite pixels having the value of 1. As another example, FIG. 5E illustrates the comparison result map 505 indicating a set of overwrite pixels having the value of 1. In various implementations, the overwrite set of the respective pixel locations excludes pixel locations indicated by the portal cross map as corresponding to the second content inside the portal that the portal count map does not indicate as corresponding to the portal.

Thus, in various implementations, the overwrite set of the respective pixel locations includes pixel locations indicated by the portal count map as corresponding to the portion and including pixel locations indicated by the portal cross map as corresponding to second content in a first three-dimensional environment. Further, the overwrite set of the respective pixel locations excludes pixel locations indicated by the portal cross map as corresponding to the second content in a second three-dimensional environment that the portal count map does not indicate as corresponding to the portal.

In various implementations, identifying the overwrite set of respective pixel locations includes comparing the portal cross map to the portal map. In various implementations, identifying the overwrite set of respective pixel locations includes determining, for each respective pixel location, whether the corresponding portal cross value is less than or equal to the corresponding portal count value.

As noted above, although various example values (e.g., 0, 1, or 2), value ranges (e.g., 1 or greater), and comparison operations (e.g., less-than-or-equal-to) are disclosed through the specification, in various implementations, other values, value ranges, and comparison operations may be used. For example, in various implementations, identifying the set of overwrite pixel locations includes determining, for each respective pixel location, whether the corresponding portal cross value is greater than the corresponding portal count value or, in other implementations, not equal to the corresponding portal count value.

The method 600 continues, in block 660, with the device replacing the first pixel color values of pixels in the rendering of the first content at the overwrite set of the respective pixel locations with the corresponding second pixel color values. For example, FIG. 3F illustrates the third rendering 306 generated by replacing pixel color values of the first rendering 301 with pixel color values of the second rendering 303 at locations indicated by the comparison result map 305. As another example, FIG. 5F illustrates the third rendering 506 generated by replacing pixel color values of the first rendering 501 with pixel color values of the second rendering 503 at locations indicated by the comparison result map 305.

In various implementations, identifying the overwrite set of respective pixel locations (in block 650) and replacing the first pixel color values (in block 660) includes performing a stencil operation within a rendering pass, wherein a portal count value corresponds to a stencil buffer value, a portal cross value corresponds to stencil reference value, a comparison operation is a less-than-or-equal operation, and a pass operation is a replace operation. Thus, in various implementations, the second content is rendered atop the first content in a single rendering pass.

In various implementations, the method 600 further includes, after replacing the first pixel color values with the corresponding second pixel color values (in block 660), rendering transparent content over the rendering of the first content. For example, FIG. 2 illustrates the image 200 of the first scene generated by rendering the partially transparent portal plane 212 over the third rendering 306. As another example, FIG. 4 illustrates the image 400 of the second scene generated by rendering the partially transparent first portal plane 412 and second portal plane 417 over the third rendering 506. In various implementations, the transparent content is associated with the first content. In various implementations, the transparent content is associated with the second content.

In various implementations, rendering each pixel of the transparent content is subject to a depth test. Similarly, in various implementations, replacing each of the first pixel color values of pixels in the rendering of the first content at the overwrite set of the respective pixel locations with the corresponding second pixel color values (in block 660) is subject to a depth test.

Figure 7:
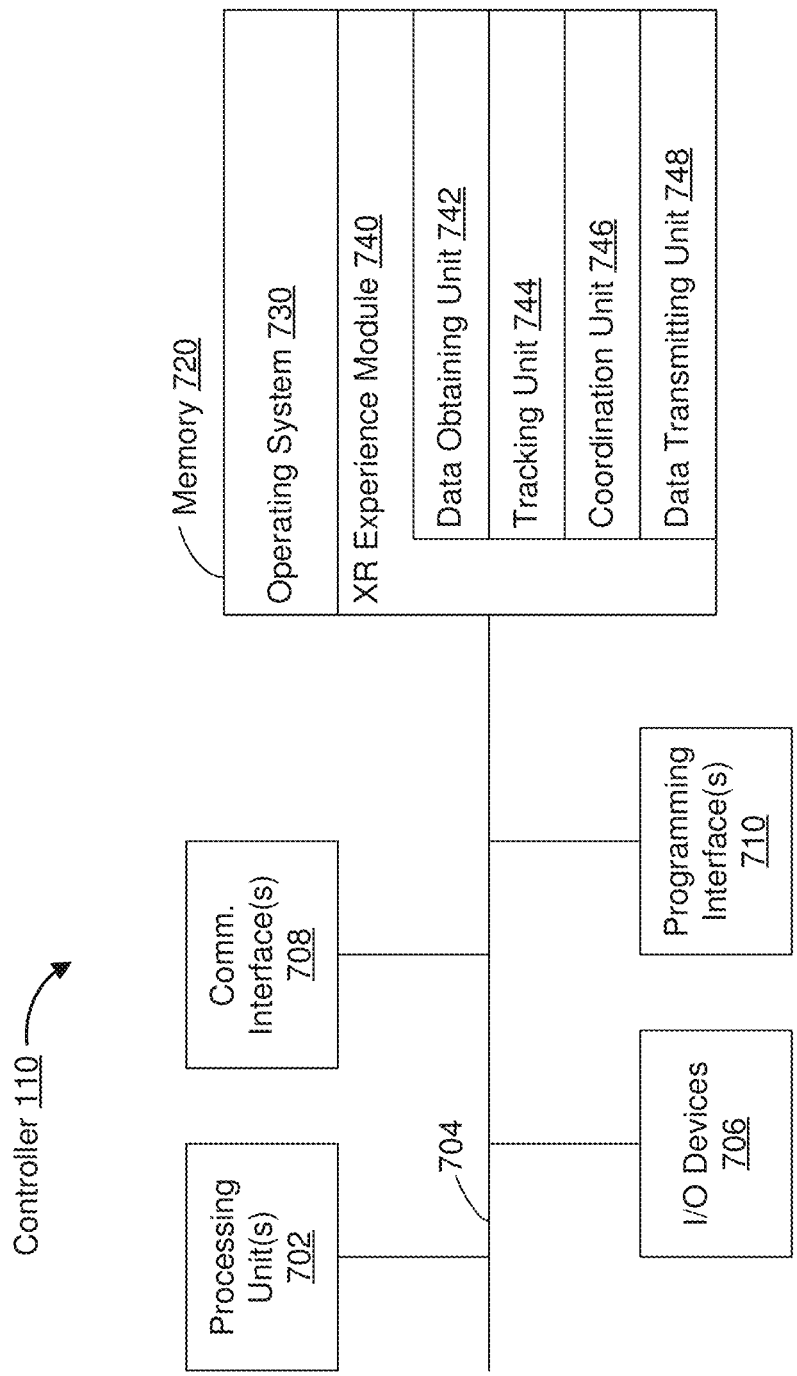
FIG. 7 is a block diagram of an example controller in accordance with some implementations.

FIG. 7 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 702 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 706, one or more communication interfaces 708 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 710, a memory 720, and one or more communication buses 704 for interconnecting these and various other components.

In some implementations, the one or more communication buses 704 include circuitry that interconnects and controls communications between system components. In some implementations, the one or more I/O devices 706 include at least one of a keyboard, a mouse, a touchpad, a joystick, one or more microphones, one or more speakers, one or more image sensors, one or more displays, and/or the like.

The memory 720 includes high-speed random-access memory, such as dynamic random-access memory (DRAM), static random-access memory (SRAM), double-data-rate random-access memory (DDR RAM), or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof including an optional operating system 730 and an XR experience module 740.

The operating system 730 includes procedures for handling various basic system services and for performing hardware dependent tasks. In some implementations, the XR experience module 740 is configured to manage and coordinate one or more XR experiences for one or more users (e.g., a single XR experience for one or more users, or multiple XR experiences for respective groups of one or more users). To that end, in various implementations, the XR experience module 740 includes a data obtaining unit 742, a tracking unit 744, a coordination unit 746, and a data transmitting unit 748.

In some implementations, the data obtaining unit 742 is configured to obtain data (e.g., presentation data, interaction data, sensor data, location data, etc.) from at least the electronic device 120 of FIG. 1. To that end, in various implementations, the data obtaining unit 742 includes instructions and/or logic therefor, and heuristics and metadata therefor.

In some implementations, the tracking unit 744 is configured to map the physical environment 105 and to track the position/location of at least the electronic device 120 with respect to the physical environment 105 of FIG. 1. To that end, in various implementations, the tracking unit 744 includes instructions and/or logic therefor, and heuristics and metadata therefor.

In some implementations, the coordination unit 746 is configured to manage and coordinate the XR experience presented to the user by the electronic device 120. To that end, in various implementations, the coordination unit 746 includes instructions and/or logic therefor, and heuristics and metadata therefor.

In some implementations, the data transmitting unit 748 is configured to transmit data (e.g., presentation data, location data, etc.) to at least the electronic device 120. To that end, in various implementations, the data transmitting unit 748 includes instructions and/or logic therefor, and heuristics and metadata therefor.

Although the data obtaining unit 742, the tracking unit 744, the coordination unit 746, and the data transmitting unit 748 are shown as residing on a single device (e.g., the controller 110), it should be understood that in other implementations, any combination of the data obtaining unit 742, the tracking unit 744, the coordination unit 746, and the data transmitting unit 748 may be located in separate computing devices.

Moreover, FIG. 7 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 8:
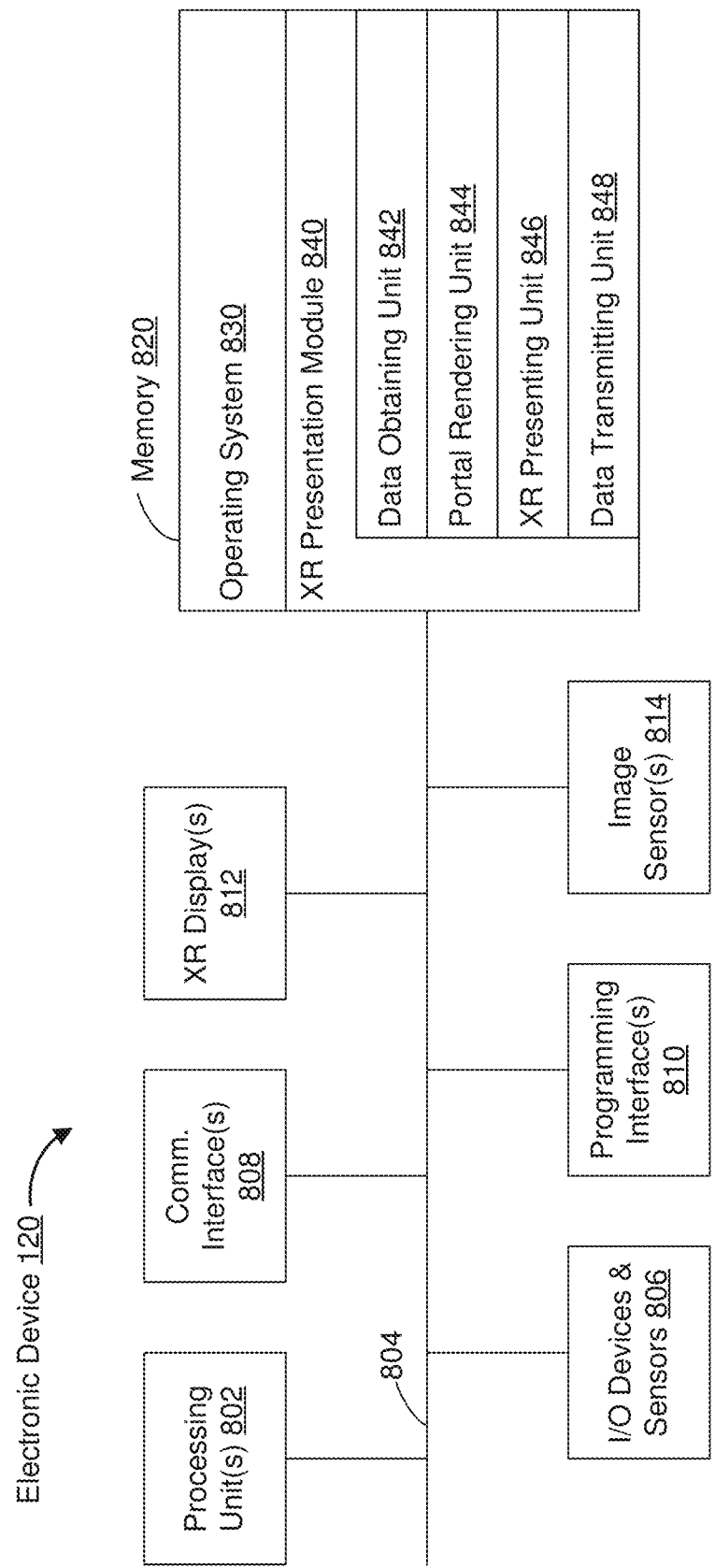
FIG. 8 is a block diagram of an example electronic device in accordance with some implementations.

FIG. 8 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 810, one or more XR displays 812, one or more optional interior- and/or exterior-facing image sensors 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 812 are configured to provide the XR experience to the user. In some implementations, the one or more XR displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 812 correspond to diffractive, reflective, polarized, holographic, etc. waveguide displays. For example, the electronic device 120 includes a single XR display. In another example, the electronic device includes an XR display for each eye of the user. In some implementations, the one or more XR displays 812 are capable of presenting MR and VR content.

In some implementations, the one or more image sensors 814 are configured to obtain image data that corresponds to at least a portion of the face of the user that includes the eyes of the user (any may be referred to as an eye-tracking camera). In some implementations, the one or more image sensors 814 are configured to be forward-facing so as to obtain image data that corresponds to the physical environment as would be viewed by the user if the electronic device 120 was not present (and may be referred to as a scene camera). The one or more optional image sensors 814 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium. In some implementations, the memory 820 or the non-transitory computer readable storage medium of the memory 820 stores the following programs, modules and data structures, or a subset thereof including an optional operating system 830 and an XR presentation module 840.

The operating system 830 includes procedures for handling various basic system services and for performing hardware dependent tasks. In some implementations, the XR presentation module 840 is configured to present XR content to the user via the one or more XR displays 812. To that end, in various implementations, the XR presentation module 840 includes a data obtaining unit 842, a portal rendering unit 844, an XR presenting unit 846, and a data transmitting unit 848.

In some implementations, the data obtaining unit 842 is configured to obtain data (e.g., presentation data, interaction data, sensor data, location data, etc.) from at least the controller 110 of FIG. 1. To that end, in various implementations, the data obtaining unit 842 includes instructions and/or logic therefor, and heuristics and metadata therefor.

In some implementations, the portal rendering unit 844 is configured to render a scene including a portal. To that end, in various implementations, the portal rendering unit 844 includes instructions and/or logic therefor, and heuristics and metadata therefor.

In some implementations, the XR presenting unit 846 is configured to display the transformed image via the one or more XR displays 812. To that end, in various implementations, the XR presenting unit 846 includes instructions and/or logic therefor, and heuristics and metadata therefor.

In some implementations, the data transmitting unit 848 is configured to transmit data (e.g., presentation data, location data, etc.) to at least the controller 110. In some implementations, the data transmitting unit 848 is configured to transmit authentication credentials to the electronic device. To that end, in various implementations, the data transmitting unit 848 includes instructions and/or logic therefor, and heuristics and metadata therefor.

Although the data obtaining unit 842, the portal rendering unit 844, the XR presenting unit 846, and the data transmitting unit 848 are shown as residing on a single device (e.g., the electronic device 120), it should be understood that in other implementations, any combination of the data obtaining unit 842, the portal rendering unit 844, the XR presenting unit 846, and the data transmitting unit 848 may be located in separate computing devices.

Moreover, FIG. 8 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including one or more processors and non-transitory memory;
   obtaining a rendering of first content having a plurality of first pixels at respective pixel locations having respective first pixel color values;
   obtaining a portal count map having a plurality of portal count pixels at the respective pixel locations having respective pixel portal count values indicating a number of portals at the respective pixel locations;
   obtaining a rendering of second content having a plurality of second pixels at the respective pixel locations having respective second pixel color values;
   obtaining a portal cross map having a plurality of portal cross pixels at the respective pixel locations having respective pixel portal cross values indicating a number of portals crossed by the second content at the respective pixel locations;
   identifying an overwrite set of the respective pixel locations at which the corresponding portal cross value is less than or equal to the corresponding portal count value; and
   replacing the first pixel color values of pixels in the rendering of the first content at the overwrite set of the respective pixel locations with the corresponding second pixel color values.

2. The method of claim 1, wherein identifying the overwrite set of respective pixel locations and replacing the first pixel color values includes performing a stencil operation within a pass, wherein a portal count value corresponds to a stencil buffer value, a portal cross value corresponds to stencil reference value, a comparison operation is a less-than-or-equal operation, and a pass operation is a replace operation.

3. The method of claim 1, wherein at least one respective pixel portal count value is greater than one.

4. The method of claim 1, wherein at least one respective pixel portal cross value is greater than one.

5. The method of claim 1, further comprising, after replacing the first pixel color values with the corresponding second pixel color values, rendering transparent content over the rendering of the first content.

6. The method of claim 5, wherein rendering each pixel of the transparent content is subject to a depth test.

7. The method of claim 1, wherein replacing each of the first pixel color values of pixels in the rendering of the first content at the overwrite set of the respective pixel locations with the corresponding second pixel color values is subject to a depth test.

8. The method of claim 1, wherein the overwrite set of the respective pixel locations excludes pixel locations at which the corresponding portal cross value is greater than the corresponding portal count value.

9. A device comprising:
   a non-transitory memory; and
   one or more processors to:
      obtain a rendering of first content having a plurality of first pixels at respective pixel locations having respective first pixel color values;
      obtain a count map having a plurality of count pixels at the respective pixel locations having respective pixel count values indicating whether the corresponding pixel location corresponds to a surface in a first three-dimensional environment to maps to a second three-dimensional environment;
      obtain a rendering of second content having a plurality of second pixels at the respective pixel locations having respective second pixel color values;
      obtain a cross map having a plurality of cross pixels at the respective pixel locations having respective pixel cross values indicating whether the corresponding pixel location corresponds to second content that has crossed the surface from the first three-dimensional environment to the second three-dimensional environment;
      identify an overwrite set of the respective pixel locations at which a comparison operation comparing the corresponding cross value to the corresponding count value results in a first value; and replace the first pixel color values of pixels in the rendering of the first content at the overwrite set of the respective pixel locations with the corresponding second pixel color values.

10. The device of claim 9, wherein the overwrite set of the respective pixel locations excludes pixel locations at which the comparison operation results in a second value.

11. The device of claim 9, wherein the one or more processors are to identify the overwrite set of respective pixel locations by determining, for each respective pixel location, whether the corresponding cross value is less than or equal to the corresponding count value.

12. The device of claim 9, wherein the one or more processors are to identify the overwrite set of respective pixel locations and replace the first pixel color values by performing a stencil operation within a pass, wherein a count value corresponds to a stencil buffer value, a cross value corresponds to stencil reference value, a comparison operation is a less-than-or-equal operation, and a pass operation is a replace operation.

13. The device of claim 9, wherein the one or more processors are to replace each of the first pixel color values of pixels in the rendering of the first content at the overwrite set of the respective pixel locations with the corresponding second pixel color values subject to a depth test.

14. A non-transitory computer-readable memory having instructions encoded thereon which, when executed by one or more processors of a device, cause the device to:

obtain a rendering of first content having a plurality of first pixels at respective pixel locations having respective first pixel color values;

obtain a portal count map having a plurality of portal count pixels at the respective pixel locations having respective pixel portal count values indicating a number of portals at the respective pixel locations;

obtain a rendering of second content having a plurality of second pixels at the respective pixel locations having respective second pixel color values;

obtain a portal cross map having a plurality of portal cross pixels at the respective pixel locations having respective pixel portal cross values indicating a number of portals crossed by the second content at the respective pixel locations;

identify an overwrite set of the respective pixel locations at which the corresponding portal cross values is less than or equal to the corresponding portal count value; and replace the first pixel color values of pixels in the rendering of the first content at the overwrite set of the respective pixel locations with the corresponding second pixel color values.

15. The non-transitory computer-readable memory of claim 14, wherein the overwrite set of the respective pixel locations excludes pixel locations at which the corresponding portal cross value is greater than the corresponding portal count value.

16. The non-transitory computer-readable memory of claim 14, wherein at least one respective pixel portal count value is greater than one.

17. The non-transitory computer-readable memory of claim 14, wherein at least one respective pixel portal cross value is greater than one.

18. The non-transitory computer-readable memory of claim 14, wherein the instructions, when executed, further cause the device to, after replacing the first pixel color values with the corresponding second pixel color values, render transparent content over the rendering of the first content.

19. The non-transitory computer-readable memory of claim 18, wherein rendering each pixel of the transparent content is subject to a depth test.

20. The non-transitory computer-readable memory of claim 14, wherein replacing each of the first pixel color values of pixels in the rendering of the first content at the overwrite set of the respective pixel locations with the corresponding second pixel color values is subject to a depth test.

* * * * *